US012421788B2

(12) United States Patent
Hern

(10) Patent No.: US 12,421,788 B2
(45) Date of Patent: Sep. 23, 2025

(54) SEALING BRACKET

(71) Applicant: Herns Pro LLC, McKinney, TX (US)

(72) Inventor: Roberto Luis Hern, McKinney, TX (US)

(73) Assignee: Herns Pro LLC, McKinney, TX (US)

( * ) Notice: Subject to any disclaimer, the term of this patent is extended or adjusted under 35 U.S.C. 154(b) by 0 days.

(21) Appl. No.: 19/019,419

(22) Filed: Jan. 13, 2025

(65) Prior Publication Data

US 2025/0230705 A1 Jul. 17, 2025

Related U.S. Application Data

(60) Provisional application No. 63/620,833, filed on Jan. 14, 2024.

(51) Int. Cl.
*E06B 7/16* (2006.01)
*E06B 1/34* (2006.01)

(52) U.S. Cl.
CPC . *E06B 7/16* (2013.01); *E06B 1/34* (2013.01)

(58) Field of Classification Search
None
See application file for complete search history.

(56) References Cited

U.S. PATENT DOCUMENTS 2,840,201 A * 6/1958 Anderson ................. E06B 1/18 52/846
3,177,924 A * 4/1965 McPhail ............... E06B 3/2605 49/63
3,469,349 A * 9/1969 Multer .................. E06B 7/2314 49/478.1
5,203,130 A * 4/1993 Freelove ................... E06B 1/64 52/211
6,269,591 B1 * 8/2001 Kelly ......................... E06B 1/70 49/482.1
6,581,323 B2 * 6/2003 Renzi .................... A01M 29/30 160/40
7,204,059 B2 * 4/2007 Schiffmann ............... E06B 1/34 52/211
9,175,507 B2 * 11/2015 Davis ......................... E06B 1/34
9,441,411 B2 * 9/2016 Davis ......................... E06B 1/34
9,759,006 B2 * 9/2017 Davis ......................... E06B 7/28
10,513,845 B1 * 12/2019 Scott ........................ E06B 3/485
11,131,139 B2 * 9/2021 Cazarez ................ E06B 3/7001
11,725,453 B2 * 8/2023 Koshar ................. A01M 29/30 49/58

(Continued)

*Primary Examiner* — Catherine A Kelly
(74) *Attorney, Agent, or Firm* — Foley & Lardner LLP

(57) ABSTRACT

A sealing bracket for a frame corresponding with a moveable barrier includes a first member and a second member coupled with the first member. The first member includes a first section to interface with a portion of the frame; a second section configured to receive fasteners to couple the first member with the frame; and a third section configured to receive fasteners to couple the first member with the frame. The first section is bent at a first angle to the second section and the third section is bent at a second angle to the second section. The second member includes a first section configured to couple with the first member; and a second section configured to receive fasteners to couple the second member with the frame. The sealing bracket seals an interface of the movable barrier to inhibit pest ingress into a structure adjacent to the frame.

21 Claims, 5 Drawing Sheets

(56) References Cited

U.S. PATENT DOCUMENTS

| | | | | |
|---|---|---|---|---|
| 11,795,750 | B2 * | 10/2023 | Kunkel | E05F 7/005 |
| 2012/0047811 | A1 * | 3/2012 | Weeks | E06B 7/28<br>49/460 |
| 2019/0261620 | A1 * | 8/2019 | Koshar | A01M 29/30 |

* cited by examiner

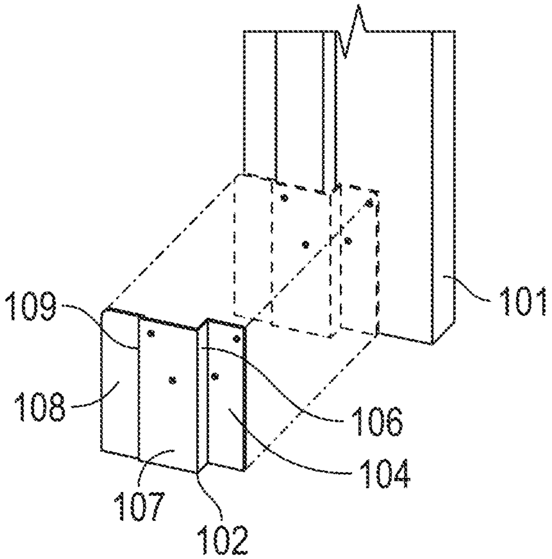
FIG. 1A1
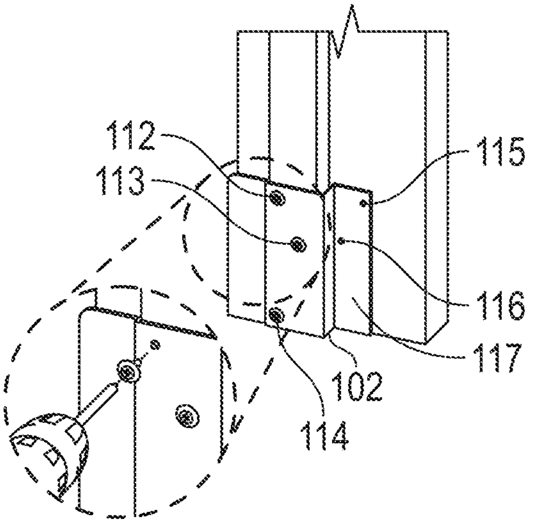
FIG. 1A2
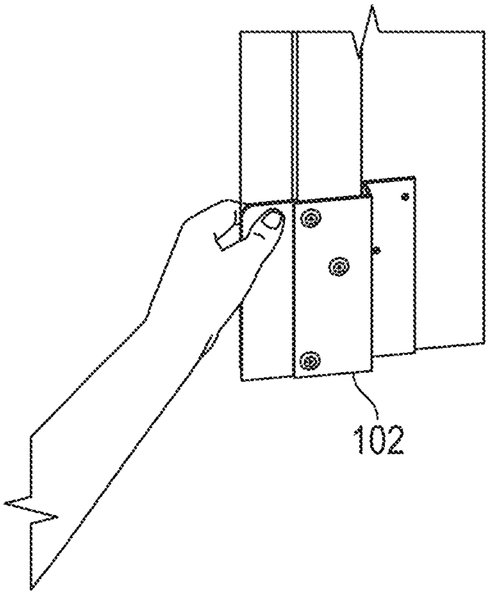
FIG. 1A3
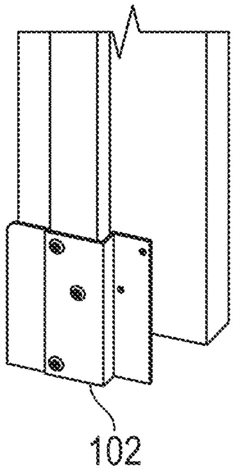
FIG. 1A4

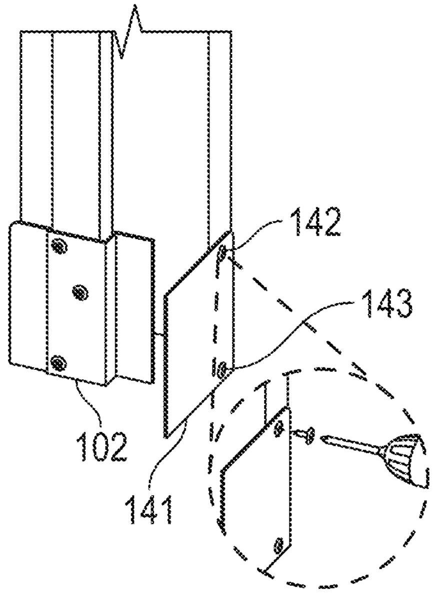
FIG. 1B1
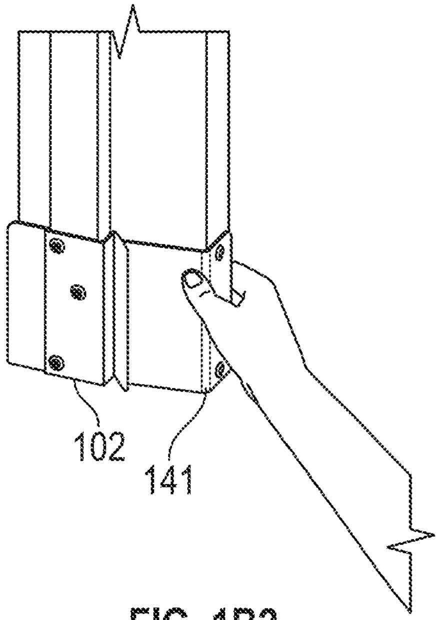
FIG. 1B2
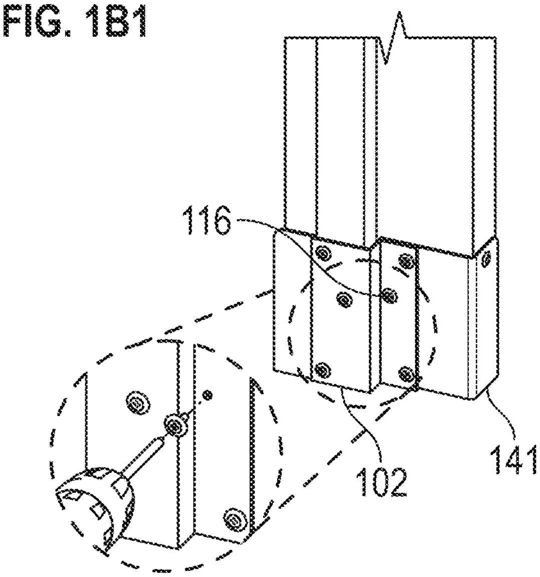
FIG. 1B3
Before
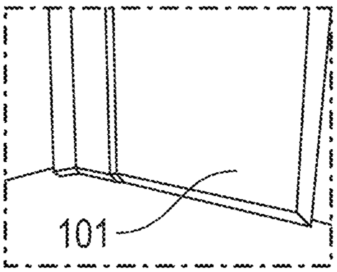
FIG. 1B4
After
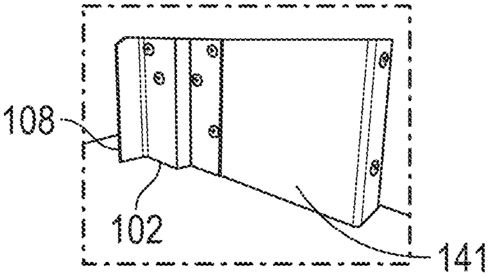
FIG. 1B5

SEALING BRACKET

CROSS-REFERENCE TO RELATED PATENT APPLICATIONS

This application claims the benefit of and priority to U.S. Provisional Patent Application No. 63/620,833, filed Jan. 14, 2024, which is incorporated herein by reference in its entirety.

BACKGROUND

Movable barriers (including, for example, garage doors) can open and close to provide access to a structure or area adjacent thereto.

SUMMARY

Some embodiments relate to a sealing bracket for a frame corresponding with a movable barrier. The sealing bracket includes a first member and a second member coupled with the first member. The first member includes a first section to interface with a portion of the frame; a second section configured to receive fasteners to couple the first member with the frame; and a third section configured to receive fasteners to couple the first member with the frame. The first section is bent at a first angle to the second section and the third section is bent at a second angle to the second section. The second member includes a first section configured to couple with the first member; and a second section configured to receive fasteners to couple the second member with the frame. The sealing bracket seals an interface of the movable barrier to inhibit pest ingress into a structure adjacent to the frame.

In some embodiments, the first section of the first member includes a rounded corner.

In some embodiments, each of the second section of the first member and the third section of the first member include two holes to receive a fastener to couple the first member with the frame.

In some embodiments, each of the first section of the first member and the third section of the first member are recessed relative to the second section of the first member.

In some embodiments, at least a portion of the first member is pliable and can be manipulated by a user.

In some embodiments, at least a portion of each of the first member and the second member are flush to the frame when the sealing bracket is coupled with the frame.

In some embodiments, the second section of the second member includes a rounded corner.

In some embodiments, the second section of the second member has at least one hole to receive a fastener to couple the second member with the frame.

In some embodiments, the first section of the second member couples with the first member and the frame.

In some embodiments, the second section of the second member is bent at an angle relative to the first section of the second member.

In some embodiments, the first member and the second member are integrally formed and made from a metal.

In some embodiments, the movable barrier is at least one of a garage door, a loading dock door, a gate, a fence, and a door.

Some embodiments relate to a pest shield assembly for installation on a frame. The pest shield assembly includes a main shield member and an auxiliary piece. The main shield is fastened to the frame. The main shield member includes a first section extending along a first surface of the frame; a first edge connecting the first section to a second section; the second section extending at an angle relative to the first section; a second edge connecting the second section to a third section; the third section extending along a second surface of the frame; and fastener receiving holes on at least two of the first section, the second section, and the third section. The auxiliary piece overlaps a portion of the main shield member and extend around the frame. The auxiliary piece includes a first section to align with the second surface of the frame; a second section extending from the first section of the auxiliary piece at an angle; and at least one fastener receiving hole to secure the auxiliary piece to the frame. The pest shield is arranged to obstruct access through a junction between the frame and an adjacent structure.

In some embodiments, the main shield member and the auxiliary piece are made from aluminum.

In some embodiments, the first section, second section, and third section of the main shield member conform to the shape of the frame.

In some embodiments, the main shield member is secured to the frame with at least three fasteners and the auxiliary piece is secure to the frame with at least two fasteners.

In some embodiments, the main shield member and the auxiliary piece include fastener receiving holes that align, and use shared fasteners when the first section of the auxiliary piece overlaps the third section of the main shield member.

Some embodiments relate to a sealing bracket assembly for a frame supporting a movable barrier. The sealing bracket assembly includes a first member and a second member. The first member includes a first section to engage a sealing element; a second section bent at an angle relative to the first section, the second section including a first set of fastener receiving holes; a folded edge configured to reinforce a side of the first member; and a third section bent at an angle relative to the folded edge, the third section including a second set of fastener receiving holes. The second member includes a fourth section, the fourth section overlapping the first member; and a fifth section, the fifth section extending from the fourth section and wrapping around an edge of the frame. The sealing bracket assembly protects a sealing interface and blocks pest intrusion.

In some embodiments, the folded edge of the first member and at least one section of the second member are bonded using fasteners.

In some embodiments, the fourth section of the second member includes at least one fastener receiving hole corresponding to at least one of the second set of fastener receiving holes of the third section of the first member.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 1A1-1A4 are various views of assembling a sealing bracket, according to an exemplary embodiment.

FIGS. 1B1-1B5 are various views of assembling the sealing bracket of FIGS. 1A1-1A4, according to an exemplary embodiment.

FIG. 4 is a perspective view of a sealing element of a frame, according to an exemplary embodiment;

FIG. 5 is a perspective view of a sealing element of a frame, according to an exemplary embodiment.

Figure 2:
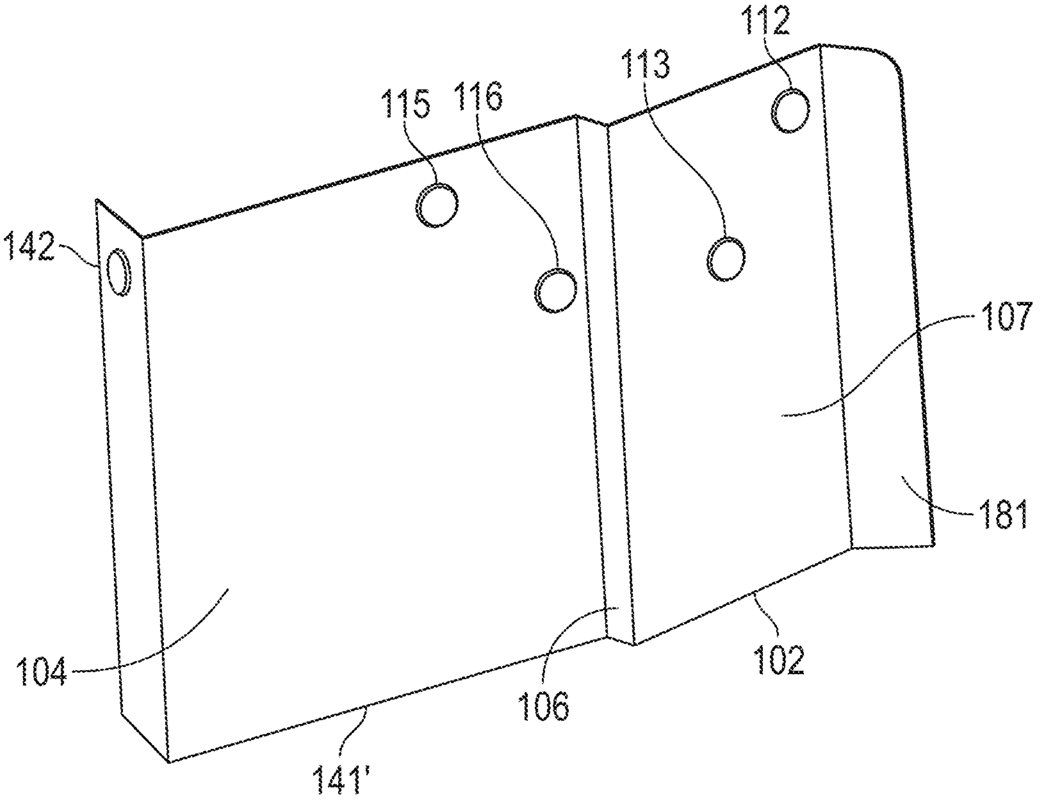
FIG. 2 is a perspective view of the sealing bracket of FIGS. 1A1-1A4, according to an exemplary embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations can be utilized, and other changes can be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments disclosed herein relate generally to methods, systems, and/or devices for inhibiting pest ingress into a structure including a movable barrier as a result of potential gaps in the movable barrier assembly. In particular, embodiments described herein relate generally to a sealing bracket including components disposed proximate to interfaces between the movable barrier and other components of its assembly. The movable barrier typically includes a frame to support the barrier. However, the interface between the barrier and the frame can include openings for pests to enter the structure adjacent to the movable barrier. The sealing bracket in accordance with the present disclosure can seal the interfaces between the movable barrier and the components of its assembly, inhibiting pest ingress into the structure adjacent thereto.

In some embodiments, the sealing bracket can be coupled with the frame of the movable barrier assembly. This can eliminate potential gaps in the assembly, thereby preventing the entry of pests into the structure adjacent to the frame. The various concepts introduced above and discussed in greater detail below can be implemented in numerous ways, as the described concepts are not limited to any particular manner of implementation. Examples of specific implementations and application are provided primarily for illustrative purposes.

The disclosed sealing bracket system provides technical improvements over existing pest prevention systems by addressing structural vulnerabilities at the interfaces between a movable barrier and its supporting frame. Unlike traditional sealing methods, such as adhesive strips or weatherproofing gaskets alone, the sealing bracket incorporates a rigid, multi-section design with bent portions that can conform to the geometric contours of the frame. This provides a flush and secure fit, reducing the likelihood of gaps caused by irregularities in the frame or misalignment during installation. Additionally, the use of multiple fastener-receiving holes facilitates mechanical reinforcement, maintaining the integrity of the seal over time even under mechanical stress or environmental exposure. By integrating a rounded corner at the end, the system further minimizes damage to sealing elements, preserving the longevity and reducing maintenance needs of the barrier. These technical advancements improve the durability of the system, ease of installation, and effectiveness in preventing pest ingress compared to existing solutions.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Sealing Bracket

As shown in FIGS. 1A1-3, a sealing bracket can include a first member, shown as shield member 102; and a second member, shown as auxiliary piece 141. According to an exemplary embodiment, the sealing bracket can be configured to be an interface of a moveable barrier to inhibit pest ingress into a structure. That is, the sealing bracket can interface with a moveable barrier to inhibit pest ingress into a structure adjacent to the moveable barrier. For example, the sealing bracket can couple with a frame corresponding to a movable barrier and inhibit pest ingress into a structure adjacent to the frame.

According to an exemplary embodiment, the shield member 102 can be made from aluminum. That is, the shield member 102 can be composed of aluminum. In some embodiments, the shield member 102 can be made from a metal (e.g., an alloy, a different pure metal, bronze, aluminum, titanium, brass, steel, any suitable metallic material, and/or any ferrous or non-ferrous material). That is, the shield member 102 can be made from a metal. For example, the shield member 102 can be made from steel. In some embodiments, the shield member 102 can be made from a polymeric material. In some embodiments, the shield member 102 can be made from any suitable material (e.g., a ceramic, a composite material, a plastic, polyethylene, polypropylene, polycarbonate, and/or any synthetic polymer).

According to an exemplary embodiment, the auxiliary piece 141 can be made from aluminum. That is, the auxiliary piece 141 can be composed of aluminum. In some embodiments, the auxiliary piece 141 can be made from a metal (e.g., an alloy, a different pure metal, bronze, aluminum, titanium, brass, steel, any suitable metallic material, and/or any ferrous or non-ferrous material). That is, the auxiliary piece 141 can be made from a metal. For example, the auxiliary piece 141 can be made from steel. In some embodiments, the auxiliary piece 141 can be made from a polymeric material. In some embodiments, the auxiliary piece 141 can be made from any suitable material (e.g., a ceramic, a composite material, a plastic, polycarbonate, and/or PTFE).

According to an exemplary embodiment, the shield member 102 and the auxiliary piece 141 can be made of the same material such that they exhibit substantially similar behavior. That is, the shield member 102 and the auxiliary piece 141 can be made from the same material. For example, both the shield member 102 and the auxiliary piece 141 can be made from aluminum. In some embodiments, the shield member 102 and the auxiliary piece 141 can be made from different materials of the same type (e.g., two different metals, steel and aluminum, brass and copper, titanium and stainless steel, and/or any combination of metals). That is, the shield member 102 and the auxiliary piece 141 can be made from two different materials of the same type (e.g., metals, polymers, ceramics, composites, alloys, and/or any suitable structural material). For example, the shield member 102 can be made from aluminum, while the auxiliary piece 141 can be made from steel. In some embodiments, the shield member 102 and the auxiliary piece 141 can at least one (e.g., each) be made from different types of materials. For example, the shield member 102 can be made from a metal such as aluminum, while the auxiliary piece 141 can be made from a polymer.

In some embodiments, the shield member 102 and the auxiliary piece 141' can be integrally formed. That is, the shield member 102 and the auxiliary piece 141' can be formed as one component. For example, the shield member 102 and the auxiliary piece 141' can be cast as a single unitary body. In some embodiments, the shield member 102 and the auxiliary piece 141' can be integrally formed and made from a metal. That is, the shield member 102 and the auxiliary piece 141' can be integrally formed and made from a metal. For example, the shield member 102 and the auxiliary piece 141' can be cast as a single unitary body made from a metal. In some embodiments, the shield member 102 and the auxiliary piece 141 can be of the same length and width. That is, the shield member 102 can have a length and width, and/or the auxiliary piece 141 can have a length and a with which measure the same as the length and width of the shield member 102. For example, the shield member 102 can have a length of 7 inches and a width of 5 inches, while the auxiliary piece 141 also has a length of 7 inches and a width of 5 inches. In some embodiments, the shield member 102 and the auxiliary piece 141 can be of different length and width. That is the shield member 102 can have a length and a width substantially smaller or larger in magnitude than a respective length and width of the auxiliary piece 141. In some embodiments, the shield member 102 and the third section 104 have a uniform thickness. In some embodiments, at least one (e.g., each) of the shield member 102 and the third section 104 can have substantially different thicknesses from the other of the shield member 102 and the auxiliary piece 141.

In some embodiments, one or more surfaces of the sealing bracket can be finished using a surface finishing process. According to an exemplary embodiment, all surfaces of the shield member 102 and the auxiliary piece 141 can be finished using a powder coating surface finishing process. That is, at least one (e.g., each) of the shield member 102 and the auxiliary piece 141 can be finished using a powder coating surface finishing process. For example, all surfaces of the shield member 102 and the auxiliary piece 141 can be finished using a powder coating surface finishing process. In some embodiments, the shield member 102 and the auxiliary piece 141 can be unfinished. In some embodiments, the shield member 102 and the auxiliary piece 141 are at least one (e.g., each) finished using different surface finishing processes. For example, the shield member 102 can be finished using a liquid painting process, while the auxiliary piece 141 can be finished using the powder coating process. In some embodiments, the shield member 102 can be finished using a surface finishing process, while the auxiliary piece 141 can be left unfinished. In some embodiments, the shield member 102 can be left unfinished, while the auxiliary piece 141 can be finished using the powder coating process.

In some embodiments, the movable barrier can be a door configured to selectively extend or retract vertically between an opened and closed position (e.g., a roll-up garage door, a loading dock door, a sectional overhead door, curtain door, scissor gate, accordion door, bifold door, panel lift door, coiling shutter door, high-speed door, insulated sectional door, and/or any other vertical barrier system). In some embodiments, the movable barrier can be one or more doors configured to selectively rotate horizontally between an opened position and a closed position (e.g., a swing garage door, pivot door, hinged gate, barn door, and/or any horizontal rotational door). In some embodiments, the movable barrier can be one or more sliding doors configured to selectively extend or retract horizontally between an opened position and a closed position (e.g., a sliding garage door, telescopic door, bypass door, pocket door, and/or any sliding panel system). In some embodiments, the movable barrier can be a fence configured to move between and opened position and a closed position.

In some embodiments, the movable barrier can be a gate. In some embodiments, the movable barrier can be any commonly used barrier to separate an interior space from an exterior space. As shown in FIG. 1A, the movable barrier includes a frame, shown as frame 101, wherein the frame 101 can be configured to support the movable barrier. In some embodiments, the frame 101 can be made of wood such that the frame 101 can receive a fastener (e.g., screws, nails, bolts, rivets, dowels, brackets, clamps, and/or any other mechanical connector) to couple with the sealing bracket. In some embodiments, the frame 101 can be made of a metallic material. In some embodiments, the frame 101 can be made from a polymeric material. In some embodiments, the frame 101 can be made from any solid material.

Referring now to FIGS. 1A1-1A4 and 1B1-1B5, various views of assembling the sealing bracket are shown, according to an exemplary embodiment. At FIG. 1A1, the shield member 102 is shown, according to an exemplary embodiment. The shield member 102 can include a first section 108, a second section 107, and/or a third section 104. In some embodiments, the frame 101 includes a plurality of fastener hole (e.g., countersunk holes, threaded holes, pilot holes, clearance holes, slotted holes, blind holes, and/or any drilled or pre-formed holes) which can be configured to receive a number of fasteners to couple the shield member 102 with the frame 101. As shown in the FIG. 1A1, the shield member 102 can be detached from and aligned with the frame 101. In some embodiments, the shield member 102 can be configured to conform to the shape of the frame 101. In this manner, the second section 107 can protrude (e.g., extend, project, jut, extrude, and/or any outward extension) outwards from the first section 108 and the third section 104. In some embodiments, the first section 108 and the third section 104 can be bent back from the second section 107.

FIG. 1A2 shows the shield member 102, a plurality of fastener holes which can be configured to receive a plurality of fasteners, and/or a plurality of fasteners, shown as fastener 112, fastener 113, fastener 114, fastener 115, fastener 116, and/or fastener 17. In some embodiments, the shield member 102 can be configured to couple with the frame 101 via a number of fasteners. In some embodiments, the fasteners 112-117, can be or include any number of screws, bolts, or any other fastener configured to enter an opening and secure one apparatus to another.

Figure 3:
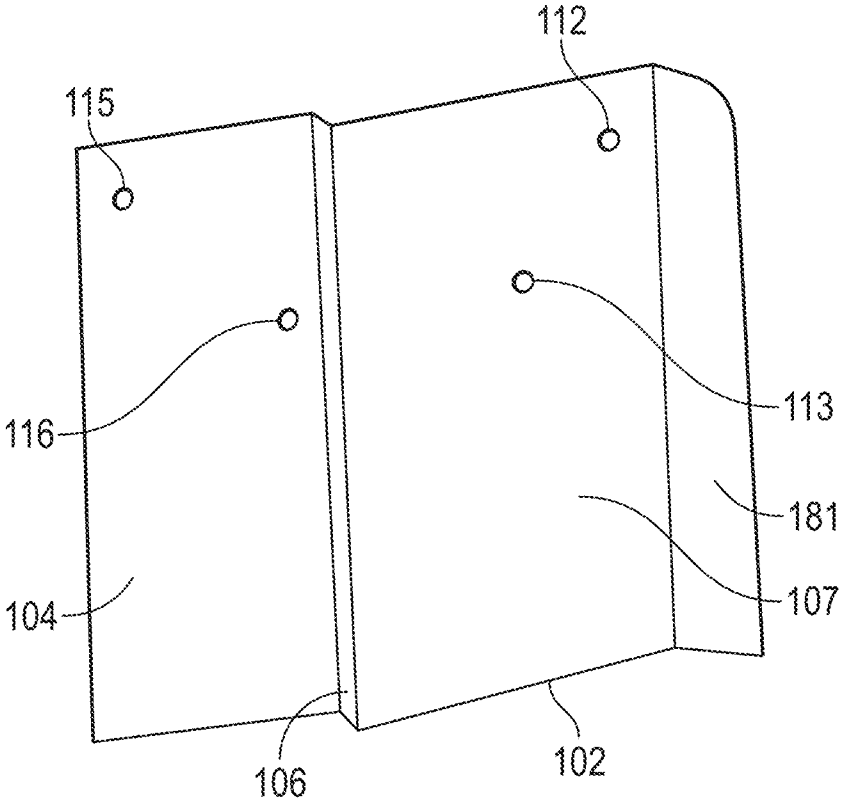
FIG. 3 is a perspective view of a first member of the sealing bracket of FIGS. 1A1-1A4, according to an exemplary embodiment.
Figure 4:
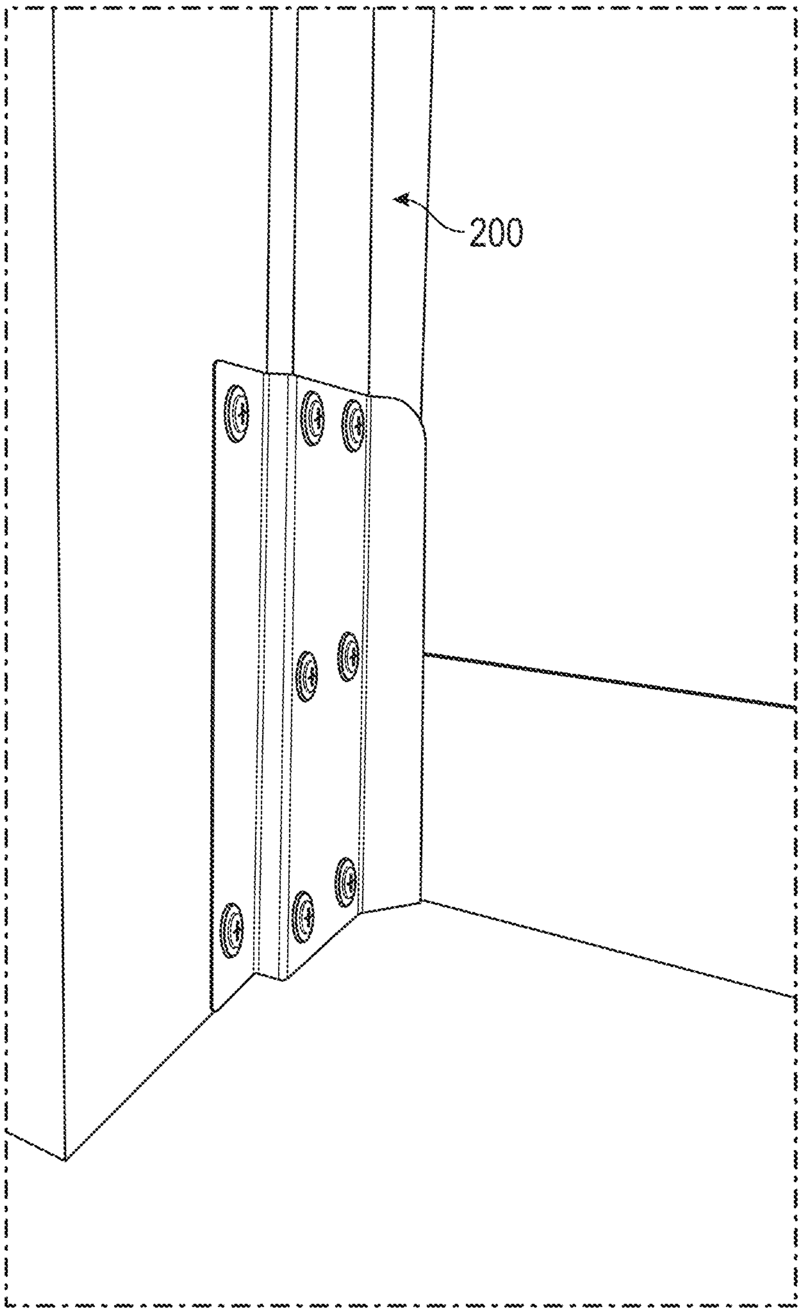

As shown in FIGS. 1A3-1A4, the shield member 102 can be coupled with the frame 101. In some embodiments, the fastener 112, the fastener 113, and/or the fastener 114 can be configured to couple the shield member 102 with the frame

101. In some embodiments, the shield member 102 can conform to the frame 101 such that the shield member 102 can be a shape similar to a shape of the frame 101.

As shown in FIG. 1B1, the auxiliary piece 141 can be coupled with the frame 101. In some embodiments, the auxiliary piece 141 can be coupled with an edge of the frame 101 via one or more fasteners. For example, the auxiliary piece 141 can receive two fasteners to couple with the frame 101. In FIG. 1B2, the auxiliary piece 141 and the shield member 102 are shown, according to an exemplary embodiment. In some embodiments, a section of the auxiliary piece 141 can be folded (e.g., bent, wrapped around, shaped, curved, angled, crimped, and/or any manipulated form) around an edge of the frame 101. In some embodiments, the auxiliary piece 141 can be configured such that when bent around the edge of the frame 101, the auxiliary piece 141 can be positioned behind (e.g., nearer the frame 101) a bent portion of the shield member 102 such that the auxiliary piece 141 can interface with the shield member 102 and the frame 101.

Figure 5:
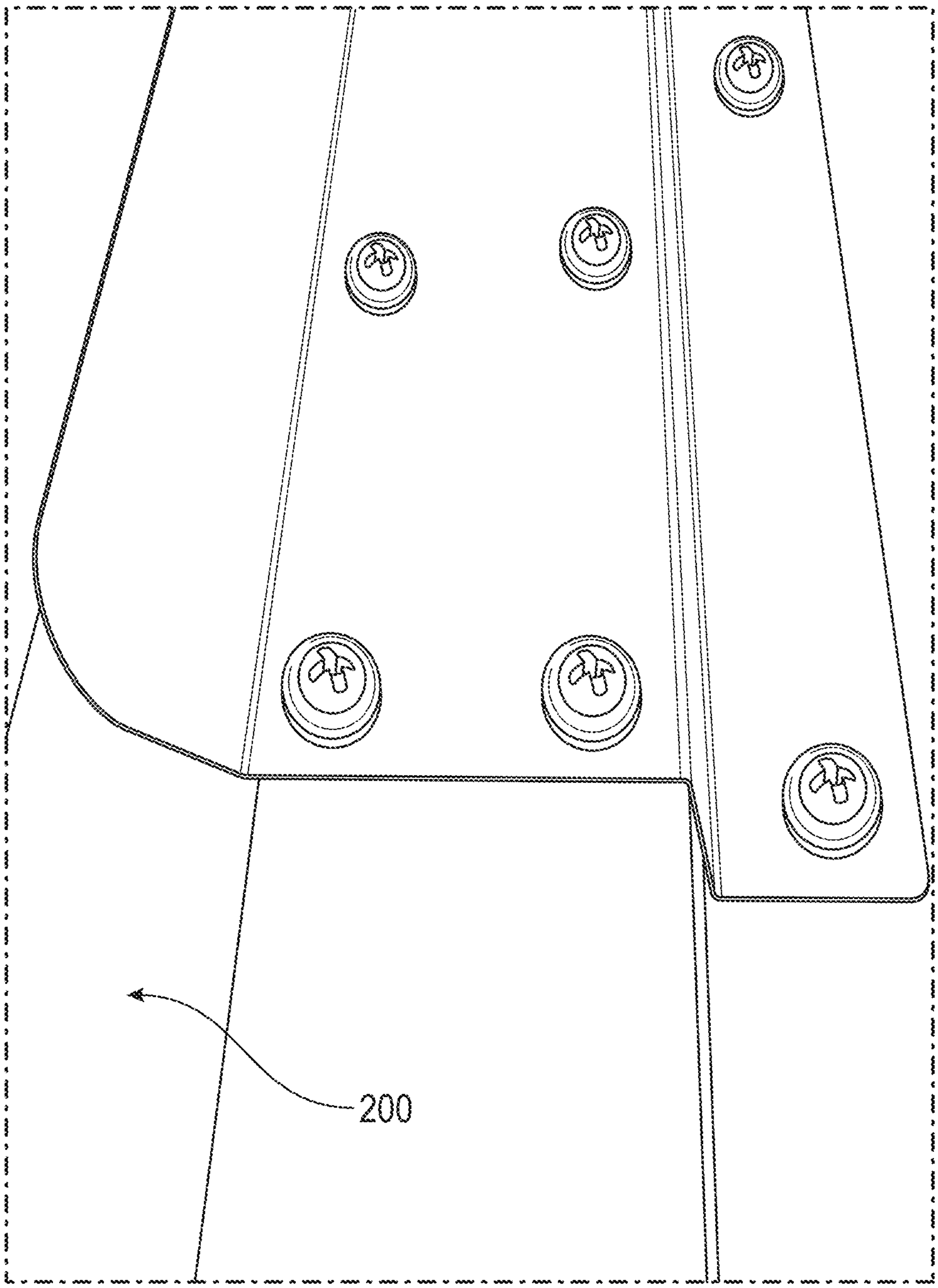

In FIG. 1B3, the shield member 102 is shown coupled with the auxiliary piece 141 and the frame 101. In some embodiments, the shield member 102 can be coupled with the auxiliary piece 141. In some embodiments, the shield member 102 can be coupled with the auxiliary piece 141 and the frame 101 via one or more fasteners. FIG. 1B4 depicts frame 101 prior to the installation of the sealing bracket assembly. That is, the frame 101 has gaps or openings along its edges, which could permit pest ingress into the adjacent structure. As shown in FIG. 1B5, the shield member 102 and the auxiliary piece 141 can be coupled with the frame such that there are no gaps allowing for pest ingress between the shield member 102, the auxiliary piece 141, and/or the frame 101. In some embodiments, the shield member 102 and the auxiliary piece 141 can be coupled with the frame 101 such that the shield member 102 and the auxiliary piece 141 are substantially flush with the frame 101.

Referring now to FIGS. 1A1-1A4, the shield member 102 is shown, according to an exemplary embodiment. In some embodiments, the shield member 102 can include a folded edge configured to provide reinforcement (e.g., support) for the shield member 102. The folded edge can be disposed along a side of the shield member 102. That is, the folded edge of the shield member 102 can provide reinforcement to the shield member 102 by interfacing with at least one of the frame 101 and the auxiliary piece 141. According to an exemplary embodiment, the shield member 102 can include the first section 108, the second section 107, and/or the third section 104. According to an exemplary embodiment, the first section 108 can be configured to interface with a portion of the frame 101. That is, the first section 108 can be configured to interface with a portion of the frame 101. For example, the first section 108 can be coupled with the frame 101. In some embodiments, the first section 108 can be mechanically coupled with the frame 101 by an adhesive. In some embodiments, the first section 108 can be coupled with the frame 101 by one or more fasteners.

In some embodiments, the first section 108 can extend along a first surface of the frame 101. That is, the first section 108 can extend along a first surface of the frame 101. For example, the first section 108 can extend along a first surface of the frame 101, while being relatively flush to the frame 101. According to an exemplary embodiment, the first section 108 can be configured to engage a sealing element 200 (as shown in FIGS. 4-5) of the movable barrier. That is, the first section 108 can be configured to engage a sealing element 200 to seal the structure adjacent to the movable barrier. For example, the movable barrier can include a sealing element 200 (e.g., a rubber lining, a vinyl seal, foam tape, silicone gasket, neoprene seal, and/or any flexible sealing material) disposed at the frame 101 and configured to partially seal and/or protect the area adjacent from the movable barrier (e.g., the interior area) from the exterior area and any conditions thereof (e.g., weather conditions, pests, debris, dust, moisture, insects, rodents, birds, mites, reptiles, bacteria, and/or any external environmental factors). The first section 108 can be configured to engage the frame 101 and the sealing element 200. By way of example, a first portion of the first section 108 can be parallel to the frame 101 such that the first section 108 couples with the frame 101, while a second portion of the first section 108 is bent at an angle relative to the first portion of the first section 108 such that the second portion of the first section 108 engages the sealing element 200.

In some embodiments, a portion of the first section 108 can be pliable and configured to be manipulated by the user. That is, at least a portion of the first section 108 can be pliable such that the first section 108 can be bent and shaped by a user to engage the sealing element 200 (as shown in FIGS. 4-5). For example, the user can manipulate at least a portion of the first section 108 such that the first section 108 engages the sealing element 200, thereby inhibiting pest ingress into the structure adjacent to the frame 101. In some embodiments, the first section 108 can include a rounded corner. That is, the first section 108 can include one or more rounded corners. For example, a top corner of the first section 108 can be rounded, with the first section 108 configured such that the rounded corner interfaces with at least one of the frame 101, the movable barrier, and/or the sealing element 200. In this manner, the rounded corner of the first section 108 can prevent damage and/or harm from the first section 108 to at least one of the frame 101, the movable barrier, the user, and/or the sealing element 200.

In some embodiments, the first section 108 can be configured to couple with at least one of the frame 101, the movable barrier, and/or the sealing element 200 to prevent pest ingress into a structure adjacent to the frame and the movable barrier. According to an exemplary embodiment, the first section 108 can be configured to engage the frame 101, the movable barrier, and/or the sealing element 200 such that there are no gaps between the first section 108 and at least one (e.g., each) of the frame 101, the movable barrier, and/or the sealing element 200 large enough for pest ingress into the adjacent structure.

In some embodiments, the first section 108 can be configured to conform to one or more beveled or angled corners of the frame 101. That is, the first section 108 can be configured to conform to the shape of one or more bent, angled, or shaped corners of the frame 101. In some embodiments, the first section 108 can be coupled with the frame 101 such that the first section 108 is flush with the frame 101. That is, the first section 108 can be coupled with the frame 101 such that there are no gaps between the shield member 102 and the frame 101. For example, the first section 108 can be coupled with the frame 101 such that at least a portion of the shield member 102 is flush to the frame 101. In some embodiments, one or more edges of the first section 108 can be bonded using an adhesive.

In some embodiments, the first section 108 is substantially parallel to the second section 107. As shown in FIG. 1A1, the first section 108 can be bent back from the second section 107. That is, the first section 108 can be recessed relative to the second section 107 of the shield member 102. For example, the frame 101 can include a protrusion where the second section 107 couples with the frame 101. The first section 108 can couple with the frame 101 such that a portion of the shield member 102 is flush to the frame 101. Therefore, the first section 108 can be recessed relative to the second section 107 to couple with the frame 101 such that the shield member 102 is substantially flush to the frame 101, inhibiting pest ingress into the structure adjacent to the frame.

In some embodiments, the first section 108 can be bent back from the second section 107 by a first bent portion 109. That is, the first bent portion 109 can be a first edge connecting the first section 108 to the second section 107. In some embodiments, the first bent portion 109 can be substantially perpendicular to at least one of the first section 108 and the second section 107. In some embodiments, the first bent portion 109 extends from the second section 107 at an angle. That is, the first section 108 can be bent at a first angle relative to the second section 107. For example, the first bent portion 109 can extend from the second section 107 at an angle relative to the second section 107. In this manner, the first section 108 can be bent from the second section 107 at a first angle at least partially defined by the first bent portion 109. In some embodiments, the angle at which the first bent portion 109 extends from the second section 107 can be an acute angle. In some embodiments, the angle at which the first bent portion 109 extends from the second section 107 can be an obtuse angle. In some embodiments, the angle at which the first bent portion 109 extends from the second section 107 can be defined by the frame 101. For example, the frame 101 can include any number of fillets, chamfers, coves, grooves, notches, bevels, and/or any other shaped contours. In order to seal the space between the frame 101 and the movable barrier, the first bent portion 109 can have a substantially similar shape as the frame 101, thereby extending from the second section 107 at an angle at least partially defined by the frame 101.

In some embodiments, the first bent portion 109 can be configured to engage with the frame 101. As shown in FIGS. 1A1-1A4 and 1B1-1B5, the first bent portion 109 extends between the first section 108 and the second section 107 at an angle substantially perpendicular to the second section 107 and the first section 108. In some embodiments, the first bent portion 109 can couple with the frame 101 via an adhesive. In some embodiments, the first bent portion 109 can couple with the frame 101 via one or more fasteners. In some embodiments, the first bent portion 109 can interface with the frame 101 without a coupling method.

In some embodiments, the shield member 102 can include the second section 107. The second section 107 can be disposed between the first section 108 and the third section 104. In some embodiments, the second section 107 extends at an angle relative to the first section 108. That is, the second section 107can be bent at an angle relative to the first section 108 and extend from the first section 108 at that angle. According to an exemplary embodiment, the second section 107 can be configured to couple with the frame 101. In some embodiments, the second section 107 is configured to conform to one or more beveled, angled, or shaped corners of the frame 101. That is, the second section 107 is structured to conform to the shape of the frame 101 such that the shield member 102 is flush to the frame 101. As shown in FIGS. 1A1-1A4, the second section 107 can include two holes configured to receive one or more fasteners (e.g., the fastener 112, the fastener 113, the fastener 114, and/or any suitable fasteners) to couple the second section 107 with the frame 101. That is, the second section 107 can include a first set of fastener receiving holes configured to receive a fastener to couple the shield member 102 with the frame 101. For example, the second section 107 can receive at least two of the fastener 112, the fastener 113, and/or the fastener 114 via the fastener receiving holes of the second section 107 to couple the shield member 102 with the frame 101.

According to an exemplary embodiment, the second section 107 can be configured to receive the fastener 112, the fastener 113, and/or the fastener 114 to couple with the frame 101. That is, the second section 107 can be configured to receive a plurality of fasteners, the fastener 112, the fastener 113, and/or the fastener 114 to couple the shield member 102 with the frame 101. For example, the second section 107 can receive the fastener 112, the fastener 113, and/or the fastener 114 to couple with the frame 101. In some embodiments, the second section 107 can receive two fasteners to couple the second section 107 with the frame 101. In some embodiments, the second section 107 can receive any number of fasteners to couple the second section 107 with the frame 101. In some embodiments, the second section 107 can couple with the frame 101 via an adhesive. In some embodiments, the second section 107 can couple with the frame 101 via a combination of an adhesive and any number of fasteners. By way of example, the second section 107 can first be coated with an adhesive paste and then receive the fastener 112 and the fastener 113 to couple with the frame 101. By way of another example, the second section 107 can receive the fastener 114 to couple with the frame 101.

As shown in FIGS. 1A1-1A4, the shield member 102 can include a second bent portion 106. According to an exemplary embodiment, the second bent portion 106 can act as a connection between the second section 107 and the third section 104. In some embodiments, the third section 104 can be bent back from the second section 107 by the second bent portion 106. That is, the second bent portion 106 can be a second edge connecting the second section 107 to the third section 104. According to an exemplary embodiment, the second bent portion 106 can conform to a corner of the frame 101. In some embodiments, the second bent portion 106 can be a substantially similar shape to the frame 101.

In some embodiments, the second bent portion 106 can be substantially perpendicular to at least one of the second section 107 and the first section 108. In some embodiments, the second bent portion 106 extends from the second section 107 at an angle. That is, the third section 104 can be bent at a second angle relative to the second section 107. For example, the second bent portion 106 can extend from the second section 107 at an angle relative to the second section 107. In this manner, the third section 104 can be bent from the second section 107 at a second angle at least partially defined by the second bent portion 106. For example, the frame 101 can include a 90° corner. In order to couple with the frame 101 such that there are no substantial gaps, the shield member 102 can conform to the shape of the frame 101. The second bent portion 106 can allow the shield member 102 to conform to the shape of the frame 101. In some embodiments, the angle at which the second bent portion 106 extends from the second section 107 can be an acute angle. In some embodiments, the angle at which the second bent portion 106 extends from the second section 107 can be an obtuse angle. In some embodiments, the angle at which the second bent portion 106 extends from the second section 107 can be an angle similar to an angle of the frame 101.

In some embodiments, the shield member 102 can include the third section 104. The third section 104 can be a part of the shield member 102 configured to engage the frame 101.

According to an exemplary embodiment, the third section 104 can include two holes configured to receive one or more fasteners (e.g., a fastener 115, a fastener 116, a fastener 117, and/or any suitable fasteners) to couple the third section 104 with the frame 101. That is, the third section 104 can include a second set of fastener receiving holes configured to receive a plurality of fasteners to couple with the frame 101. For example, the third section 104 can receive two or more of the fastener 115, the fastener 116, and/or the fastener 117 to couple with the frame 101. According to an exemplary embodiment, the third section 104 can be configured to receive the fastener 115, the fastener 116, and/or the fastener 117 to couple the third section 104 with the frame 101. In some embodiments, the third section 104 can be configured to receive any number of fasteners to couple the third section 104 with the frame 101. In some embodiments, the third section 104 can couple with the frame 101 via an adhesive. In some embodiments, the third section 104 can couple with the frame 101 via a combination of an adhesive and any number of fasteners. In some embodiments, the third section 104 can be bent back from the second section 107. That is, the third section 104 can be recessed relative to the second section 107 of the shield member 102. For example, the frame 101 can include a protrusion where the second section 107 couples with the frame 101. The third section 104 can couple with the frame 101 such that a portion of the shield member 102 is flush to the frame 101. Therefore, the third section 104 can be recessed relative to the second section 107 to couple with the frame 101 such that the shield member 102 is substantially flush to the frame 101, inhibiting pest ingress into the structure adjacent to the frame 101.

In some embodiments, the third section 104 can extend along a second surface of the frame 101. That is, the third section 104 can extend along a second surface of the frame 101. For example, the third section 104 can extend along a second surface of the frame 101, while being relatively flush to the frame 101. In some embodiments, the third section 104 can be configured to conform to one or more beveled or angled corners of the frame 101. That is, the third section 104 can be configured to conform to the shape of one or more bent, angled, or shaped corners of the frame 101.

According to an exemplary embodiment, the third section 104 can be configured to couple with the shield member 102 with the auxiliary piece 141. That is, the third section 104 can be configured to couple with the auxiliary piece 141 to assemble the sealing bracket. In some embodiments, the fastener 115, the fastener 116 and the fastener 117 can be used to couple the third section 104 with the auxiliary piece 141, as shown in FIG. 1B3. In some embodiments, the third section 104 couples with the auxiliary piece 141 via an adhesive. In some embodiments, the third section 104 couples with the auxiliary piece 141 via a combination of an adhesive and any number of fasteners. By way of example, the third section 104 can couple with the auxiliary piece 141 via the fastener 115, the fastener 116, and/or the fastener 117. By way of another example, the third section 104 can couple with the auxiliary piece 141 via the fastener 115, the fastener 116, the fastener 117, and/or an adhesive. By way of another example, the third section 104 can couple with the auxiliary piece 141 via a combination of any one or more of the fastener 115, the fastener 116, the fastener 117 and an adhesive.

In some embodiments, the sealing bracket can include both the shield member 102 and the auxiliary piece 141. In this manner, the third section 104 can be coupled with the auxiliary piece 141 to create a sealing bracket assembly, which then can be coupled with the frame 101. In some embodiments, the shield member 102 and the auxiliary piece 141 can be coupled to the frame 101 via the fastener 115, the fastener 116, and/or the fastener 117. For example, the shield member 102 can couple with the auxiliary piece 141 using the fasteners (e.g., the fastener 115, the fastener 116, and/or the fastener 117) which can be used to couple the third section 104 with the auxiliary piece 141, as described with reference to FIGS. 1B1-1B5 above. In this manner, the frame 101 can receive the fastener 115, the fastener 116, and/or the fastener 117, thereby coupling the frame 101 with the auxiliary piece 141 and the shield member 102. In some embodiments, the shield member 102 and the auxiliary piece 141 can be coupled with the frame 101 via one or more of the fastener 115, the fastener 116, and/or the fastener 117. In some embodiments, the shield member 102 and the auxiliary piece 141 can couple with the frame 101 via any number of fasteners. For example, the shield member 102 can couple with the auxiliary piece 141 via the fastener 115 and the fastener 116, and/or then the shield member 102 and the auxiliary piece 141 can couple with the frame 101 via the fastener 115 and the fastener 116. In another example, the shield member 102 can couple with the auxiliary piece 141 via the fastener 115, and/or then the shield member 102 and the auxiliary piece 141 can couple with the frame 101 via the fastener 115. In some embodiments, the shield member 102 and the auxiliary piece 141 can couple with the frame 101 via an adhesive. In some embodiments, the shield member 102 and the auxiliary piece 141 can couple with the frame 101 via a combination of any number of fasteners and an adhesive.

In some embodiments, the sealing bracket can include the shield member 102, while omitting the auxiliary piece 141. In this manner, the third section 104 can be coupled directly to the frame 101 via one or more of the fastener 115, the fastener 116, and/or the fastener 117. As shown in FIG. 3, the shield member 102 can be coupled with the frame 101 via the fastener 115, the fastener 116, the fastener 112, and/or the fastener 113.

As shown in FIGS. 2-3, the shield member 102 can include an end 181 configured to engage the sealing element 200 (as shown in FIGS. 4-5) of the movable barrier. According to an exemplary embodiment, the end 181 can pliable. In some embodiments, the end 181 can be manipulated by a user to engage the sealing element 200. For example, the end 181 of the shield member 102 can be pliable and manipulated by a user to engage the sealing element 200. According to an exemplary embodiment, the end 181 can include a rounded corner to prevent contact between a sharp corner and at least one of the user, the sealing element 200, the movable barrier, and/or the frame 101. For example, a sharp (e.g., 90° angle) corner can harm (e.g., cut, scratch, puncture, abrade, irritate, and/or any cause of physical injury to) a user and potentially damage the sealing element 200. Advantageously, the rounded corner can prevent this harm to the user and the sealing element 200. According to an exemplary embodiment, the end 181 can be bent at an angle relative to at least one part of the shield member 102. In some embodiments, the end 181 can be bent at an angle of 45° relative to the second section 107. In some embodiments, the end 181 can be part of the first section 108. For example, the end 181 can be an end of the first section 108 such that the end 181 extends at an angle relative to the rest of the first section 108.

Referring now to FIGS. 1B1-1B5, the shield member 102 and the auxiliary piece 141 are shown, according to an exemplary embodiment. In some embodiments, the auxiliary piece 141 can be configured to overlap a portion of the shield member 102 and extend around a corner of the frame 101. That is, the auxiliary piece 141 can be configured to at least partially overlap the shield member 102 and extend outward from the shield member 102 and around a corner of the frame 101. For example, the auxiliary piece 141 can overlap the third section 104 and extend substantially away from at least one component of the shield member 102 and around a corner of the frame 101 such that the auxiliary piece 141 is substantially flush to at least a portion of the shield member 102 and the frame 101, preventing access through a junction between the frame 101 and an adjacent structure.

It should be understood that while end 181 is depicted in FIGS. 2-3, the sealing bracket assembly is not limited to configurations including an end. In some embodiments, end 181 can be excluded to facilitate easier alignment with certain frame geometries or sealing elements that do not require additional engagement at the terminal edge. Alternatively and/or in combination, the end can be modified, such as by using a beveled or tapered edge, to reduce material use or improve flexibility for fitting around irregular frame surfaces. In some embodiments, the sealing bracket can include a straight edge without any end feature to reduce assembly complexity. Regardless of whether end 181 is included, the sealing bracket assembly remains effective in sealing the interface between the frame and movable barrier, inhibiting pest ingress and maintaining structural integrity. The decision to incorporate end 181 or an alternative edge configuration can depend on specific installation requirements, environmental conditions, and/or desired sealing performance.

In some embodiments, the auxiliary piece 141 can include a first section and a second section. According to an exemplary embodiment, the first section can be configured to align with and overlap the shield member 102 such that the third section 104 aligns with and overlaps the auxiliary piece 141. That is, the first section of the auxiliary piece 141 can be configured to overlap the shield member 102 and align with the third section 104 and the second surface of the frame 101. For example, and/or as shown in FIG. 1B2, the auxiliary piece 141 can overlap the shield member 102 and align with the third section 104. In some embodiments, the first section of the auxiliary piece 141 can be configured to couple with the shield member 102. That is, the auxiliary piece 141 can be coupled with the shield member 102 via the first section of the auxiliary piece 141 and the third section 104.

In some embodiments, the first section of the auxiliary piece 141 can be the fourth section of the sealing bracket. As shown in FIG. 1B2, the third section 104 can be a folded edge of the shield member 102. That is the third section 104 can be a folded edge of the shield member 102. The folded edge of the shield member 102 (e.g., the third section 104) can be configured to couple with the first section of the auxiliary piece 141. In some embodiments, the folded edge of the shield member 102 can be bonded to the first section of the auxiliary piece 141 via an adhesive. That is, the shield member 102 can be coupled with the auxiliary piece 141 via an adhesive between the third section 104 and the first section of the auxiliary piece 141. In some embodiments, the first section of the auxiliary piece 141 can be configured to receive at least one of the fastener 115, the fastener 116, and/or the fastener 117, as shown in FIG. 1B3, to couple the auxiliary piece 141 with the frame 101. In this manner, at least one of the fastener 115, the fastener 116, and/or the fastener 117 can be used to couple the auxiliary piece 141 with the frame 101.

In some embodiments, the first section of the auxiliary piece 141 can be configured to couple with the shield member 102 and the frame 101. That is, the first section of the auxiliary piece 141 can be configured to couple with both the shield member 102 and the frame 101. For example, the auxiliary piece 141 can be coupled with the shield member 102, and/or then the combination of the auxiliary piece 141 and the shield member 102 can be coupled with the frame 101 such that the shield member 102 and the auxiliary piece 141 (e.g., the sealing bracket) is flush with the frame 101. In some embodiments, the auxiliary piece 141 can include a plurality of fastener receiving holes that align with the holes of the third section 104 when the auxiliary piece 141 overlaps the third section 104. That is, the auxiliary piece 141 and the shield member 102 can include corresponding fastener receiving holes that align and receive shared fasteners to couple with at least one (e.g., each) other when the first section of the auxiliary piece 141 overlaps the third section 104 of the shield member 102. For example and as discussed above, the auxiliary piece 141 and the shield member 102 can couple via the fastener 115, the fastener 116, and/or the fastener 117.

In some embodiments, the first section of the auxiliary piece 141 can be coupled with a second surface of the frame 101. In some embodiments, the first section of the auxiliary piece 141 can be a fourth section of the sealing bracket. In this manner, the fourth section of the sealing bracket can include at least one fastener receiving hole corresponding to at least one of the second set of fastener receiving holes of the third section 104 of the shield member 102. For example, the fourth section of the sealing bracket can include one or more holes configured to receive at least one of the fastener 115, the fastener 116, and/or the fastener 117.

According to an exemplary embodiment, the second section of the auxiliary piece 141 can extend from the first section of the auxiliary piece 141 and be bent about the frame 101 at an angle relative to the first section of the auxiliary piece 141. That is, the second section of the auxiliary piece 141 can be bent at an angle relative to the first section of the auxiliary piece 141. As shown in FIGS. 1B-2, the second section of the auxiliary piece 141 can engage a different portion of the frame 101 that the first section of the auxiliary piece 141 such that the second section of the auxiliary piece 141 is angled differently than the first section of the auxiliary piece 141. In some embodiments, the second section of the auxiliary piece 141 can be a fifth section of the sealing bracket configured to wrap around an edge of the frame 101. That is, the auxiliary piece 141 can be configured to wrap around an edge of the frame 101 such that the auxiliary piece 141, and/or thereby the sealing bracket, is flush with the frame 101, preventing pest ingress into the structure adjacent to the frame 101.

In some embodiments, the auxiliary piece 141 can include one or more fastener receiving holes configured to receive a fastener and couple with the frame 101. That is, the second section of the auxiliary piece 141 can include one or more holes configured to receive a fastener such as a fastener 142 and/or a fastener 143 to couple the auxiliary piece 141 with the frame 101. In some embodiments, the second section of the auxiliary piece 141 can be configured to receive two fasteners (e.g., the fastener 142 and the fastener 143) to couple the second section of the auxiliary piece 141 to the frame 101, as shown in FIGS. 1B1 and 1B5. In some embodiments, the second section of the auxiliary piece 141 can be coupled with the frame 101 via any number of fasteners. In some embodiments, the second section of the auxiliary piece 141 can be coupled with the frame 101 via an adhesive. For example, an adhesive can be applied to the auxiliary piece 141, which is then mechanically coupled with the frame 101. In some embodiments, the second section of the auxiliary piece 141 can be coupled with the frame 101 via a combination of any number of fasteners and an adhesive. For example, an adhesive can be applied to the second section of the auxiliary piece 141, which then receives one or more of the fastener 142 and the fastener 143, which can work in combination to couple the second section of the auxiliary piece 141 to the frame 101. According to an exemplary embodiment, the second section of the auxiliary piece 141 can include one or more rounded corners. That is, the second section of the auxiliary piece 141 can include one or more rounded corners. For example, a top corner of the second section of the auxiliary piece 141 can be rounded. The rounded corner can prevent harm to the user, the frame 101, and/or the like by the auxiliary piece 141.

Referring now to FIG. 2, the assembly of the shield member 102 and the auxiliary piece 141 is shown, according to an exemplary embodiment. As shown, the auxiliary piece 141 can be coupled with the shield member 102 via the fastener 115 and the fastener 116. In some embodiments, the fastener 115 and the fastener 116 can be configured to couple the shield member 102 with the auxiliary piece 141 as well as to couple the shield member 102 and the auxiliary piece 141 with the frame 101. In the configuration shown, the second section of the auxiliary piece 141 can extend and be bent from the first section of the auxiliary piece 141 at an angle relative to the first section of the auxiliary piece 141. In some embodiments, the second section of the auxiliary piece 141 can extend at an angle that is substantially perpendicular to the first section of the auxiliary piece 141. In some embodiments, the angle at which the second section of the auxiliary piece 141 is bent from the first section of the auxiliary piece 141 at an angle at least partially defined by the frame 101, such that the auxiliary piece 141 conforms to the shape of the frame 101. In this manner, the auxiliary piece 141 can couple with the frame 101 such that there are no substantial gaps between the frame 101 and the auxiliary piece 141. In some embodiments, the second section of the auxiliary piece 141 can extend substantially parallel to the second bent portion 106, as shown in FIG. 2.

In some embodiments, the shield member 102 can be coupled with the frame 101 using at least three fasteners (e.g., the fastener 112, the fastener 113, the fastener 114, the fastener 115, the fastener 116, the fastener 117, and/or any suitable fastener). That is, the shield member 102 can be secured to the frame 101 using at least three of the fastener 112, the fastener 113, the fastener 114, the fastener 115, the fastener 116, and/or the fastener 117. For example, the shield member 102 can receive the fastener 113, the fastener 114, and/or the fastener 117 to couple the shield member 102 with the frame 101. In some embodiments, the shield member 102 can couple with the frame 101 using any number of fasteners.

In some embodiments, the auxiliary piece 141 can couple with the frame 101 using at least two fasteners (e.g., the fastener 142, the fastener 143, and/or any suitable fastener). That is, the auxiliary piece 141 can receive at least two of the fastener 112, the fastener 113, the fastener 114, the fastener 115, the fastener 116, the fastener 117, the fastener 142, and/or the fastener 143 to secure the auxiliary piece 141 to the frame 101. For example, the auxiliary piece 141 can receive the fastener 142 and the fastener 143 to couple with the frame 101. In some embodiments, the auxiliary piece 141 can couple with the frame 101 using any number of fasteners.

Referring to FIG. 3, the shield member 102 includes a third section 104, a second section 107, and a second bent portion 106 connecting the two. The third section 104 extends along a second surface of the frame, while the second section 107 extends along a first surface of the frame. The second bent portion 106 is disposed between the second section 107 and the third section 104 and is bent at an angle to conform to a corner of the frame. The second section 107 includes two fastener-receiving holes 112 and 113, which can be configured to receive fasteners for coupling the shield member 102 to the frame. Similarly, the third section 104 includes fastener-receiving holes 115 and 116 to secure the shield member 102 to the frame along its second surface.

The shield member 102 further includes an end 181 on the second section 107. The end 181 is configured with a rounded corner and/or a beveled edge to prevent sharp edges that could cause harm to a user, the frame, or the sealing element 200. The rounded corner and/or a beveled edge also facilitates smoother engagement between the shield member 102 and the sealing element 200, enhancing the sealing functionality. When the shield member 102 is coupled with the frame via the fasteners 112, 113, 115, and 116, the shield member 102 conforms tightly to the frame, inhibiting pest ingress and providing a secure barrier. The bent sections, including the second bent portion 106, allow the shield member 102 to align flush with the geometry of the frame.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, spacing, alignment, curvature, and/or any geometric characteristic), the terms "approximately," "about," "substantially," and similar terms are meant to cover minor variations in structure that can result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be understood that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to at least one (e.g., each) other, with the two members coupled to at least one (e.g., each) other using a separate intervening member and any additional intermediate members coupled with one another, or with the two members coupled to at least one (e.g., each) other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

References herein to the positions of elements (e.g., "top," "bottom," "above," "below") are merely used to describe the orientation of various elements in the figures. It should be understood that the orientation of various elements can differ according to other exemplary embodiments, and/or that such variations are intended to be encompassed by the present disclosure.

Although the figures and description can illustrate a specific order of method steps, the order of such steps can differ from what is depicted and described, unless specified differently above. Also, two or more steps can be performed concurrently or with partial concurrence, unless specified differently above. Such variation can depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and/or decision steps.

It is important to note that the construction and arrangement of the shield member 102, the auxiliary piece 141, and/or the components thereof as shown in the various exemplary embodiments is illustrative only. Additionally, any element disclosed in one embodiment can be incorporated or utilized with any other embodiment disclosed herein.

What is claimed is:

1. A sealing bracket for a frame corresponding with a movable barrier, comprising:

a first member comprising:

a first section configured to engage a sealing element of the frame and interface with a first recessed portion of the frame;

a second section configured to receive a first plurality of fasteners to couple the first member with the frame supporting the moveable barrier, wherein the second section and a protrusion of the frame receive the first plurality of fasteners to couple the second section with the protrusion of the frame;

a third section configured to receive a second plurality of fasteners to couple the first member with a second recessed portion of the frame; and wherein the first section is bent at a first angle to the second section and the third section is bent at a second angle to the second section; and a second member coupled with the first member, the second member comprising:

a first section configured to couple with the first member;

a second section configured to receive at least one third fastener to couple the second member with the frame;

wherein the sealing bracket seals an interface of the moveable barrier to inhibit pest ingress into a structure adjacent to the frame, and wherein:

the first plurality of fasteners couple the first member with the frame;

the second plurality of fasteners couple the first member with the second member and couple the first member and the second member with the frame; and the at least one third fastener couples the second member with the frame.

2. The sealing bracket of claim 1, wherein the first section of the first member further comprises a rounded corner.

3. The sealing bracket of claim 1, wherein:

the second section of the first member further comprises two holes configured to receive two of the first plurality of fasteners to couple the first member with the frame; and the third section of the first member further comprises two holes configured to receive two fasteners of the second plurality of fasteners to couple the first member with the frame.

4. The sealing bracket of claim 1, wherein:

the first section of the first member is recessed relative to the second section of the first member; and the third section of the first member is recessed relative to the second section of the first member.

5. The sealing bracket of claim 1, wherein at least a portion of the first member is pliable and configured to be manipulated by a user.

6. The sealing bracket of claim 1, wherein each of the first member and the second member are configured such that when the sealing bracket is coupled with the frame, at least a portion of each of the first member and the second member is substantially flush to the frame.

7. The sealing bracket of claim 1, wherein the second section of the second member further comprises a rounded corner.

8. The sealing bracket of claim 1, wherein the second section of the second member further comprises one or more holes configured to receive one or more fasteners of the at least one third fastener to couple the second member to the frame.

9. The sealing bracket of claim 1, wherein the first section of the second member is configured to couple with the first member and the frame.

10. The sealing bracket of claim 1, wherein the second section of the second member is bent at an angle relative to the first section of the second member.

11. The sealing bracket of claim 1, wherein the first member and the second member are integrally formed and made from a metal.

12. The sealing bracket of claim 1, wherein the movable barrier is at least one of:

a garage door;

a loading dock door;

a gate;

a fence; and a door.

13. A pest shield assembly for installation on a frame, comprising:

a main shield member configured to be fastened to the frame and engage a sealing element of the frame, the main shield member comprising:

a first section extending along a first surface of the frame;

a first edge connecting the first section to a second section;

the second section extending at an angle relative to the first section, the second section configured to receive a first plurality of fasteners to couple the main shield member with the frame;

a second edge connecting the second section to a third section;

the third section extending along a second surface of the frame, the third section configured to receive a second plurality of fasteners to couple the main shield member with the frame;

a plurality of fastener-receiving holes on at least two of the first section, the second section, or the third section;

an auxiliary piece configured to overlap a portion of the main shield member and extend around a corner of the frame, the auxiliary piece comprising:

a first section configured to align with the second surface of the frame, the first section configured to receive the second plurality of fasteners to couple the auxiliary piece with the main shield member;

a second section extending from the first section of the auxiliary piece at an angle, the second section configured to receive at least one third fastener to couple the auxiliary piece with the frame;

at least one fastener-receiving hole for securing the auxiliary piece to the frame;

wherein the pest shield assembly is arranged to obstruct access through a junction between the frame and an adjacent structure, and wherein:

the first plurality of fasteners couple the main shield member with the frame;

the second plurality of fasteners couple the main shield member with the auxiliary piece and couple the main shield member and the auxiliary piece with the frame; and the at least one third fastener couples the auxiliary piece with the frame.

14. The pest shield assembly of claim 13, wherein the main shield member and the auxiliary piece are composed of aluminum.

15. The pest shield assembly of claim 13, wherein the first section, second section, and third section of the main shield member are configured to conform to one or more beveled or angled corners of the frame.

16. The pest shield assembly of claim 13, wherein the main shield member is secured to the frame using at least three fasteners, and wherein the auxiliary piece is secured to the frame using at least two fasteners.

17. The pest shield assembly of claim 13, wherein the main shield member and the auxiliary piece comprise corresponding fastener-receiving holes that align, using shared fasteners, when the first section of the auxiliary piece overlaps the third section of the main shield member.

18. A sealing bracket assembly for a frame supporting a movable barrier, comprising:

a first member comprising:

a first section configured to engage a sealing element and interface with a first recessed portion of the frame;

a second section bent at an angle relative to the first section and comprising a first set of fastener-receiving holes configured to receive a first plurality of fasteners, wherein the second section and a protrusion of the frame receive the first plurality of fasteners to couple the second section with the protrusion of the frame;

a third section defining a folded edge, the third section bent at an angle relative to the second section and comprising a second set of fastener-receiving holes configured to receive a second plurality of fasteners to couple the first member with a second recessed portion of the frame;

a second member comprising:

a fourth section configured to overlap the first member and receive the second plurality of fasteners to couple the second member with the first member;

a fifth section extending from the fourth section and adapted to wrap around an edge of the frame, the fifth section configured to receive at least one third fastener to couple the second member with the frame;

wherein the sealing bracket assembly is configured to protect a sealing interface and block pest intrusion, and wherein:

the first plurality of fasteners couple the first member with the frame;

the second plurality of fasteners couple the first member with the second member and couple the first member and second member with the frame; and the at least one third fastener couples the second member with the frame.

19. The sealing bracket assembly of claim 18, wherein the folded edge of the first member and at least one section of the second member are bonded using fasteners.

20. The sealing bracket assembly of claim 18, wherein the fourth section of the second member comprises at least one fastener-receiving hole corresponding to at least one of the second set of fastener-receiving holes of the third section of the first member.

21. A sealing bracket for a frame corresponding with a movable barrier, comprising:

a first section configured to interface with a first recessed portion of the frame and engage a sealing element of the frame, wherein the first section is pliable to be bent to engage the sealing element;

a second section configured to receive a first plurality of fasteners to couple the sealing bracket with the frame supporting the movable barrier, wherein the second section and a protrusion of the frame receive the first plurality of fasteners to couple the second section with the protrusion of the frame;

a third section configured to receive a second plurality of fasteners to couple the sealing bracket with a second recessed portion of the frame;

wherein the first section is bent at a first angle to the second section and the third section is bent at a second angle to the second section;

a fourth section configured to receive at least one third fastener to couple the sealing bracket with the frame; and wherein the sealing bracket seals an interface of the movable barrier to inhibit pest ingress into a structure adjacent to the frame.

* * * * *